(12) United States Patent
Suess et al.

(10) Patent No.: US 12,264,734 B2
(45) Date of Patent: Apr. 1, 2025

(54) GEAR

(71) Applicant: IMS GEAR SE & CO. KGAA, Donaueschingen (DE)

(72) Inventors: Marius Suess, Blumberg (DE); Sebastian Birk, Trossingen (DE); Michael Knoepfle, Huefingen (DE); Paul Schachtschneider, Villingen-Schwenningen (DE); Eugen Stoppel, Muehlingen (DE); Michael Dold, Braeunlingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 18/367,737

(22) Filed: Sep. 13, 2023

(65) Prior Publication Data
US 2024/0093774 A1 Mar. 21, 2024

(30) Foreign Application Priority Data

Sep. 16, 2022 (EP) .................................... 22196180

(51) Int. Cl.
*F16H 55/17* (2006.01)
*F16H 57/032* (2012.01)

(52) U.S. Cl.
CPC ........... *F16H 57/032* (2013.01); *F16H 55/17* (2013.01)

(58) Field of Classification Search
CPC ............................... F16H 55/17; F16H 57/032
See application file for complete search history.

(56) References Cited

U.S. PATENT DOCUMENTS

| 6,070,484 A | 6/2000 | Sakamaki |
| 6,454,044 B1* | 9/2002 | Menjak ................ B62D 5/0424 180/444 |
| 2015/0047448 A1* | 2/2015 | Ta ........................... F16H 55/17 74/434 |

(Continued)

FOREIGN PATENT DOCUMENTS

| DE | 20022502 U1 | 11/2011 |
| DE | 102016104915 A1 | 9/2017 |
| DE | 102017201383 A1 | 8/2018 |

OTHER PUBLICATIONS

European search report issued Mar. 2, 2023, in corresponding application EP 22196180.8.

*Primary Examiner* — William C Joyce
(74) *Attorney, Agent, or Firm* — Nath, Goldberg & Meyer; Jerald L. Meyer; Stanley N. Protigal (57) ABSTRACT

A gear has a gear body made of a first plastic material. The gear body has an axis of rotation, external toothing arranged around an axis of rotation, a centrally located receiving opening, and an intermediate portion located between the external toothing and the wall of the receiving opening. The gear body is fixedly integrally formed on a support body, which is arranged at least partially in the intermediate portion and is made of a second plastic material having a higher stiffness and lower elasticity than the first plastic material, such that surface portions of the external toothing, of the wall of the receiving opening, of the intermediate portion, and of the support body form a substantially flat end face of the gear. The external toothing is helical toothing with teeth which, at least in portions, extend at a helix angle to the axis of rotation.

20 Claims, 7 Drawing Sheets

(56) References Cited

U.S. PATENT DOCUMENTS

| | | |
|---|---|---|
| 2017/0166239 A1 | 6/2017 | Kim et al. |
| 2018/0180155 A1 | 6/2018 | Wehrle et al. |
| 2022/0029648 A1 | 1/2022 | Ringstrom et al. |

* cited by examiner

GEAR

FIELD

The invention relates to a gear which is made of first and second plastic materials, having external toothing arranged around an axis of rotation.

BACKGROUND

Examples of one-piece gears made of plastic are well known from DE 10 2017 201 383 A1, DE 200 22 502 U1, US2002/0029648 A1, and U.S. Pat. No. 6,070,484. The gears have external toothing arranged around a central axis of rotation. Centrally the gear has a receiving opening for receiving an axle or shaft, and an intermediate portion integrally connects this receiving opening to the external toothing. These known gears have what is known as spur toothing, i.e., the teeth of the external toothing are oriented parallel to the axis of rotation of the gear. Spur toothing of this type is problematic in respect of its smooth running and noise.

Also known are what are referred to as multi-component gears, which are composed of different materials, e.g., different plastics, and parts.

Gears of this type are increasingly being used in particular for applications in auxiliary drives of motor vehicles, such as electric steering systems, electric seat adjustments, and electromechanical brakes. It is essential that these gears meet high strength requirements, but at the same time are small and generate little noise during operation.

In automotive engineering in general, but also in particular in the implementation of electromechanical brakes, electric steering systems, and electric seat adjustments, there is a need to produce weight-saving and space-saving motor vehicle components using gears that contribute to low noise when these motor vehicle components are in operation. In addition, due to increasing cost pressure, there is a requirement to produce such components required for the vehicles as inexpensively as possible.

SUMMARY

This is where the present invention comes in.

The aim of the invention is to develop the plastic gears mentioned at the outset, in particular for use in an auxiliary drive of a motor vehicle, in such a way that the gears take up little space, can be produced inexpensively and additionally meet the necessary strength requirements. Nevertheless, such a gear should be characterized by low noise and very smooth running.

The gear according to the invention has a gear body made of a first plastic material, the gear body having
an (imaginary) axis of rotation,
external toothing arranged around an axis of rotation,
a centrally (i.e., concentric to the imaginary axis of rotation) located, in particular cylindrical, receiving opening, and
an intermediate portion located between the external toothing and the wall of the receiving opening.

For the sake of completeness, it is noted that the axis of rotation is an imaginary axis used to define geometric features of the gear. It is therefore not a physically present axial portion arranged on the gear.

According to the invention, the gear body is fixedly integrally formed on a support body, which is arranged at least partially in the intermediate portion and is made of a second plastic material, which has a higher stiffness and lower elasticity than the first plastic material, specifically such that surface portions of the external toothing, of the wall of the receiving opening, of the intermediate portion, and of the support body form a substantially flat end face of the gear.

The end face of the gear is a surface formed by the surface portions which are perpendicular to the axis of rotation of the gear and delimit the gear in one of the two axial directions.

In addition to flat end faces where there is no measurable height offset, in particular no measurable height offset between surface portions of adjacent components of the gear contributing to the end face, and where these surface portions are oriented exactly parallel to each other, the term "substantially flat end face" also includes end faces where there is a slight height offset, in particular a formation of steps, which offset does not exceed a height of approximately 1 mm and/or where adjacent surface portions are slightly tilted relative to each other, for example by 1 to 2 degrees. Such deviations can occur, for example, when manufacturing with two-component technology, because the second material added to the mold shrinks somewhat. If there is a step, it is preferred for the "higher" region formed by this step to consist of a friction-optimized plastic material or thermoplastic, in particular polyoxymethylene (POM).

According to the invention, the support body also has reinforcing portions for teeth of the external toothing.

Significant advantages in terms of noise are achieved by virtue of the following: according to the invention the external toothing is helical toothing with teeth which, at least in portions, extend at a helix angle to the axis of rotation; in order to simultaneously achieve the required strength for this toothing in the case of a small gear, according to the invention at least some of the reinforcing portions extend at least in portions at an angle which corresponds at least approximately to the helix angle of the helical toothing.
In particular, it is preferred for this portion of the reinforcing portions to be the one that is closest to the teeth of the toothing and is therefore at the furthest distance from the axis of rotation of the gear.

A glass-fiber-reinforced, aramid-fiber-reinforced, or carbon-fiber-reinforced plastic material, or a glass-bead-filled or mineral-filled plastic material, in particular a polyphenylene sulfide (PPS) reinforced or filled in this way, has proven to be a particularly suitable second plastic material.

It has also proven particularly useful for the first plastic material to be a friction-optimized plastic material or a thermoplastic, in particular polyoxymethylene (POM).

Although it is possible in principle to produce such a gear in such a way that the angle V, at which at least parts of the reinforcing portions extend, corresponds precisely or at least fairly precisely to the helix angle W of the external toothing, according to a development of the invention the angle V is selected to be smaller than the helix angle W. According to the invention, the angle satisfies in particular the following specification or at least approximately follows it:

$$V = \arctan(\tan(W) \times (r)/(d0/2)),$$

where
$d0/2$ = half the pitch diameter of the external toothing
and
$r$ = distance of a reference point of the reinforcing portion from the axis of rotation R.

Such a reference point can in particular lie at the reinforcing portion tip nearest the toothing. In this case, r would then be the radius of the addendum circle of the reinforcing portions of the support body. Embodiments are also conceivable in which the reinforcing portion is curved in such a way that the angle V at which the corresponding portion of the reinforcing portion extends is not constant, but changes according to the distance from the axis of rotation of the gear, in particular according to the above-mentioned formula.

To implement a gear according to the invention, it has proven to be expedient for the helix angle W to be greater than 0 degrees and less than 25 degrees, preferably approximately 10 degrees to 20 degrees and in particular approximately 15 degrees.

Preferred support bodies have an annular carrier structure which is oriented perpendicularly to the axis of rotation and on which the reinforcing portions associated with the individual teeth of the gear are arranged. An arrangement with a large number of reinforcing portions, which extend at an angle V to the central axis, can be implemented particularly easily in this way. In particular, therefore, the reinforcing portions do not extend exactly in the axial direction, starting from the annular carrier structure, but at the angle V.

The reinforcing portions can extend in the radial direction toward respective teeth of the external toothing and can extend as far as the dedendum circle of the external toothing or even protrude into it. In particular, the reinforcing portions can project beyond the annular carrier structure in the radial direction, at least in portions, which then results in the reinforcing portion being embedded in the gear body when the support body is overmolded during the manufacture of the gear and not being able to work its way out of the gear body.

The transmission of force via the annular carrier structure can be improved if the annular carrier structure has first projections that each project in the radial direction toward a tooth of the external toothing.

If these first projections of the carrier structure, which each project in the radial direction toward a tooth of the external toothing, are set back in the radial direction with respect to the maximum extent of the reinforcing portions and the reinforcing portions are set back in the axial direction with respect to the substantially flat end face, overmolding results in a portion of the tooth body which covers the reinforcing portion in the axial direction and thus prevents the support body from working its way out.

The transmission of force via the support body is further improved if the annular carrier structure has second projections which are set back counter to the radial direction toward the wall of the receiving opening. It is particularly advantageous for a first projection, which projects in the radial direction toward a tooth of the external toothing, and a second projection, which is set back counter to the radial direction toward the wall of the receiving opening, to be opposite one another at each relevant point of the annular carrier structure.

It can also be advantageous for regions of the reinforcing portions nearest the receiving opening—in particular those located below the second projections or protruding toward the receiving opening beyond the annular carrier structure—to extend not at the angle V, but parallel to the central axis.

It is also preferred for the support body to have openings which each extend through the annular carrier structure into a reinforcing portion in a direction parallel to the axis of rotation; it is particularly preferred for at least some of these openings to have an undercut.

The receiving opening in the gear is equipped with a suitable structure for receiving a hub, shaft, or spindle. If the receiving opening is intended to receive a spindle, the receiving opening is preferably provided with spindle-nut toothing into which the spindle can be screwed. Such a spindle can, for example, actuate an actuating piston of an electric brake when the gear, which is part of a gear arrangement of an electric brake, is rotated.

In a particular embodiment of the invention, the gear, on one of its axial end faces, is provided with an extension for receiving a radial and axial bearing, such as a ball bearing. In this case, the extension can be formed as a circumferential ring having a large number of evenly distributed ribs which are directed radially outward, an outer diameter of the extension being smaller than an outer diameter of the external toothing. The ball bearing mentioned above can, for example, be slid onto the ribs in a clamping manner, provided that the ribs have an outer diameter that is selected to be somewhat larger than the receiving ring of the ball bearing.

If the gear has an extension on an axial end face, it is advisable to provide a circumferential, concave depression between the extension and the axial end face of the gear. Such a circumferential, concave depression reduces the shearing forces when the gear is loaded.

In another embodiment of the invention, the radially outwardly pointing end faces of the teeth of the gear, viewed in the axial direction of the gear, are designed in a stepped manner. The external toothing can in this case have one or more steps. Such a gradation of the outer end faces of the teeth, i.e., the tooth crest of the teeth, ensures an increase in the contact pattern of the gear.

In a development of the invention, the teeth of the external toothing have, viewed in the axial direction, a peripheral toothing portion which transitions from the helical toothing with the helix angle W into spur toothing with the helix angle 0 degrees. This measure allows stresses in the tooth root of the external toothing to be distributed over a larger area.

BRIEF DESCRIPTION OF THE DRAWINGS

The invention is explained in more detail below on the basis of figures representing an exemplary embodiment, in which:

FIG. 8b is a sectional view along the first section line A-A of FIG. 8a;

FIG. 9b is a sectional view along the second section line A-A of FIG. 9a;

FIG. 10b is a sectional view along the first section line A-A of FIG. 10a.

DETAILED DESCRIPTION

In the following figures, the same reference signs designate the same parts with the same meaning, unless a different meaning is explicitly indicated. However, to improve the clarity of the figures, not all reference numbers are indicated in all the figures.

Figure 1:
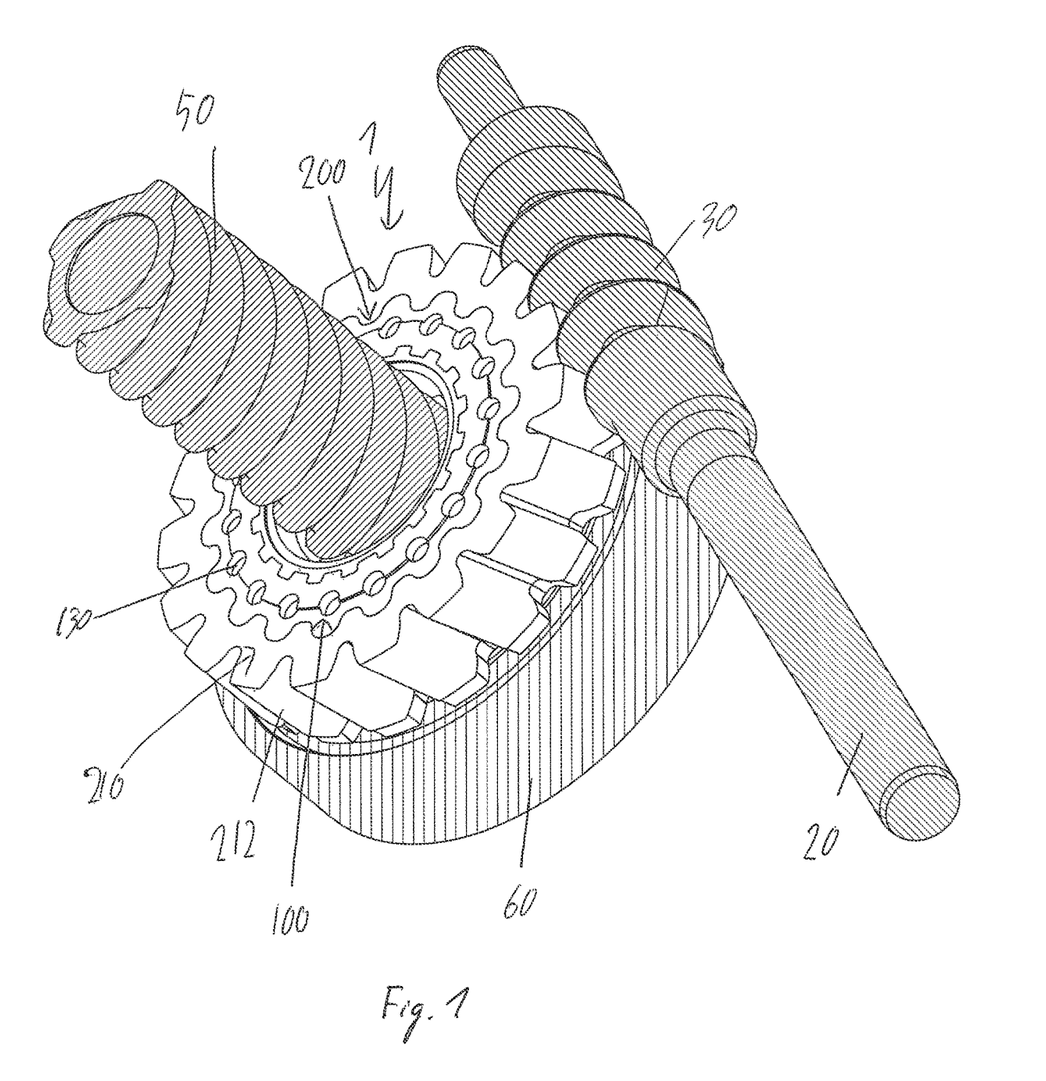
FIG. 1 is a perspective view of a gear according to the invention with a specific application situation together with a drive shaft and with a spindle that is inserted into the gear.

FIG. 1 shows a perspective view of a gear 1 in an exemplary embodiment, such as can be used, for example, in a brake actuator for a brake system in a motor vehicle. The components with which the gear 1 interacts in the configuration of this application are shown hatched. The side 2 of the gear 1 facing the viewer is also referred to in the following as the front side of the gear 1 and views showing this front side are front views. The side 3 of the gear 1 opposite the side 2 is accordingly referred to as the rear side and can be seen in rear views of the gear 1.

The gear 1 consists of two plastic parts that are fixedly connected to one another by plastic injection molding, specifically a gear body 200 made of a first plastic material and a support body 100 made of a second plastic material, which has a higher stiffness and lower elasticity than the first plastic material. Using plastic injection molding, the gear body 200 is fixedly integrally formed on, and in some regions around, the support body 100. Details of this are explained in more detail below.

Figure 4:
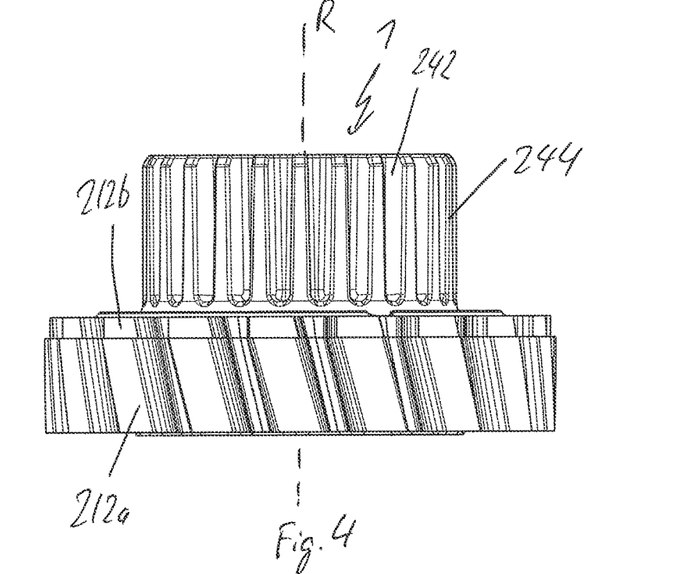
FIG. 4 is a side view of the gear of FIGS. 1 to 3.
Figure 5:
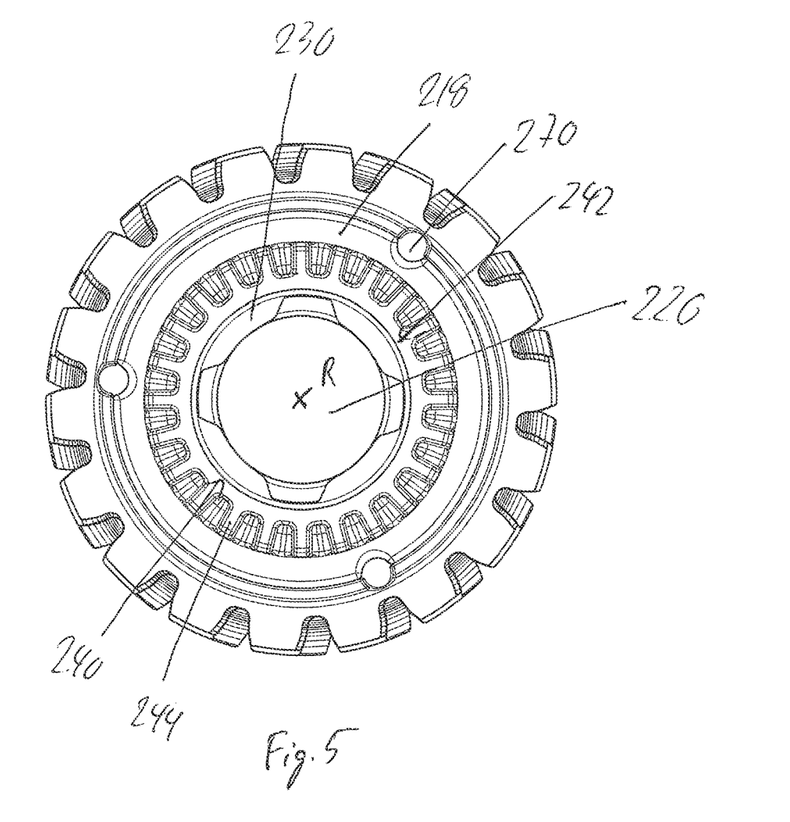
FIG. 5 is a top view of the rear side of the gear from FIGS. 1 to 4 with visible injection points.
Figure 9A:
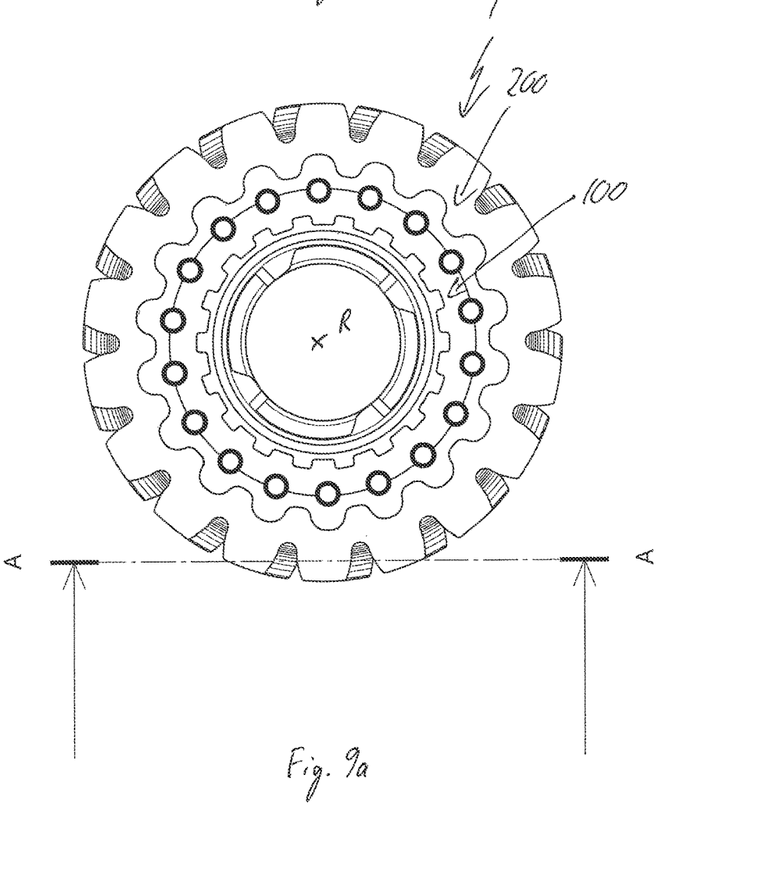
FIG. 9a is a top view of the front side of the gear of FIGS. 1 to 5 with a second section line A-A.
Figure 9B:
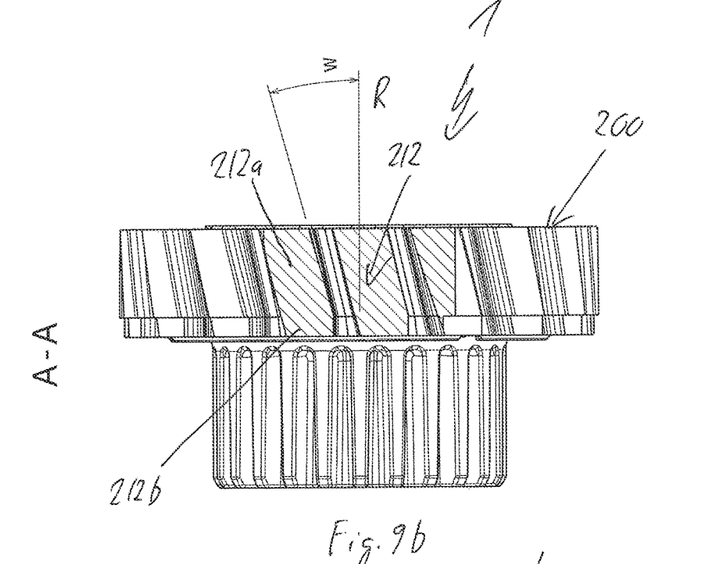

The gear 1 has external toothing 210 with teeth 212 on the gear body 200. The external toothing 210 is helical toothing; the teeth 212 extend, as can be seen in the view of FIG. 4 and particularly well in the sectional view of FIG. 9b, along the section line A-A shown in FIG. 9a and extending in the pitch circle of the external toothing 210 of the gear 1, at least in portions, specifically in the tooth portions 212a at a helix angle W to the imaginary axis of rotation R of the gear 1, the position of which is drawn by way of example in FIGS. 4, 5, 9a, and 9b. This helix angle W is >0° and is, for example, about 15° in the exemplary embodiment shown. The helix angle (W) can also be between about >0° and <25°, preferably between about 10° and 20°.

This external toothing 210 meshes with a worm 30, the worm 30 being fixedly mounted on a shaft 20 which can be driven, for example, by a motor (not shown in FIG. 1).

Figure 2:
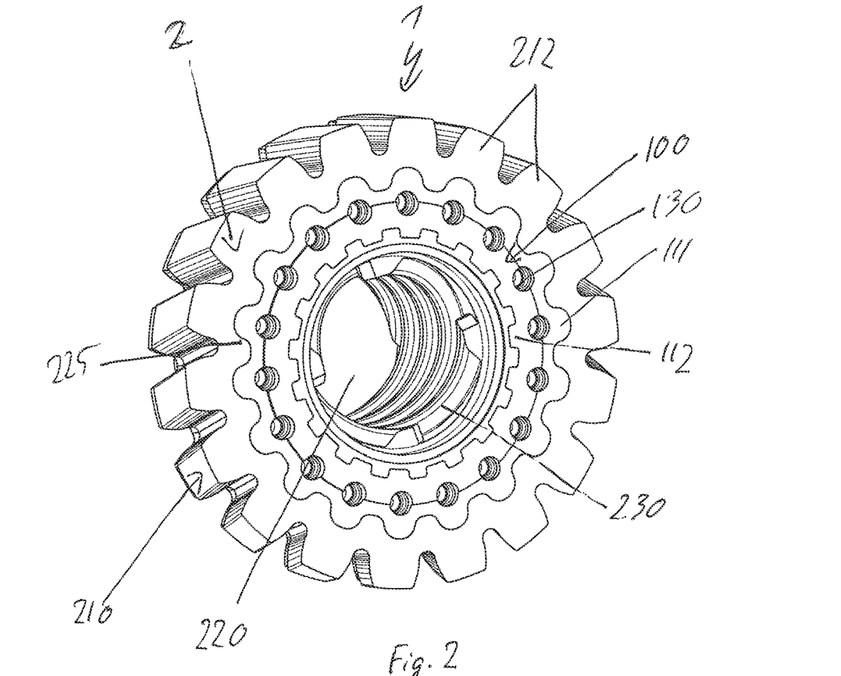
FIG. 2 is a perspective view of the gear of FIG. 1 viewed obliquely from the front.

Inside the gear body 200, as can be seen particularly well in FIG. 2, in a centrally located receiving opening 220, or more precisely at the wall of said receiving opening 220, there is spindle-nut toothing 230 which is engaged by a spindle 50 such that, when the worm 30 rotates, the rotational movement of said worm can be converted into a translational movement of the spindle 50 along a longitudinal axis X. The spindle can, for example, press on a piston in a hydraulic circuit which acts upon a brake or a brake piston.

Figure 3:
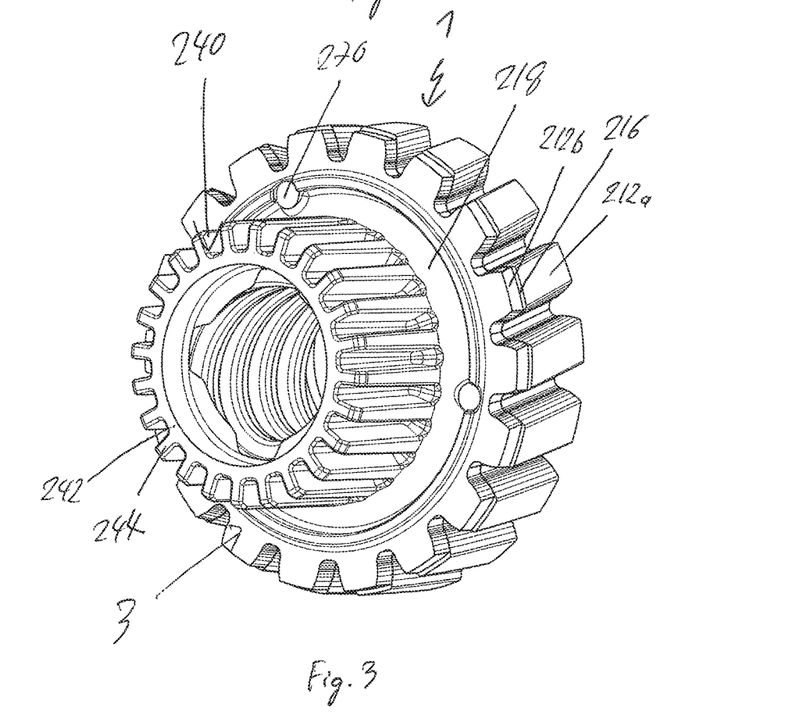
FIG. 3 is a perspective view of the gear of FIG. 2 viewed obliquely from behind.

As can be seen, for example, in FIG. 2 and particularly clearly in FIG. 3, the teeth 212 of the outer toothing do not transition directly into the wall 221 of the receiving opening 220, meaning that the gear body 200 has an intermediate region 225 in which, in particular, the portions of the support body 100 visible in FIG. 1 are located, specifically such that surface portions of the external toothing 210, of the wall 221 of the receiving opening 220, of the intermediate portion 225, and of the support body 100 form the substantially flat end face of the gear 1 that can be seen in FIG. 1, which face is also referred to in the following as the front end face of the gear 1.

The fact that this end face is not completely but only substantially flat is only apparent on closer inspection of FIGS. 4, 8b, 9b, and 10b. Although the transitions between, firstly, the surfaces of the external toothing 210 or the intermediate portion 225 or the wall 221 of the receiving opening 220, and, secondly, the support body 100, are stepless, the surface of the support body 100 has a minimal circumferential step with a height of less than 1 mm, which leads to a slight parallel offset of the end face surface, but which is so small that it does not significantly affect the space required for the gear 1.

On the side 3 opposite the front end face, i.e., the rear side of the gear 1, there is an extension 240, on which a radial and axial bearing 60 in the form of a ball bearing is received in this application example.

As can be seen particularly well in FIG. 4, the extension 240 has a smaller diameter D1 compared to the diameter D2 of the outer toothing 210. The extension 240 consists of an annular elongation 242 of the wall 221 of the receiving opening 220. Ribs 244 extend radially outwardly from the annular elongation 242. The bearing 60 is preferably placed in a clamping manner on these ribs 244, for which purpose the outer dimensions of the ribs 244 are selected to be slightly larger than the inner diameter of the bearing, in particular the ball bearing.

Accordingly, the end face of the rear side 3 of the gear 1 is clearly not substantially flat, since it is formed by the rear surface portions of the external toothing 210, the rear surface of the intermediate portion 225, and the end face of the extension 240, which face is clearly at a distance from the other components of the end face of the rear side 3 of the gear in the axial direction.

As is clearly shown in particular in FIGS. 3 and 4, the radially outwardly pointing end faces of the teeth 212 of the external toothing 210 each have a step 216 when viewed in the axial direction of the imaginary central axis R. As can be seen particularly well in FIG. 4, the step 216 also defines a transition from a tooth portion 212a of the teeth 212, which forms the helical toothing with the angle W, to a tooth portion 212b of the teeth 212, in which spur toothing with the helix angle 0 is present, as a result of which stresses in the tooth root of a tooth 212 of the external toothing 210 are distributed over a larger area.

Figure 8A:
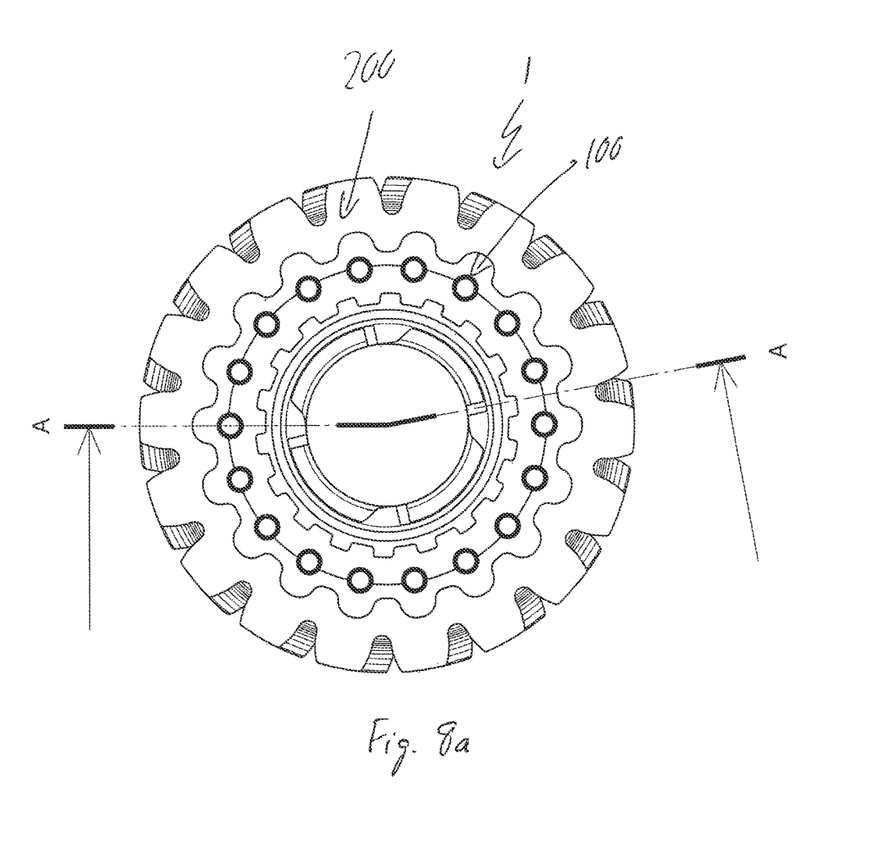
FIG. 8a is a top view of the front side of the gear of FIGS. 1 to 5 with a first section line A-A.
Figure 8B:
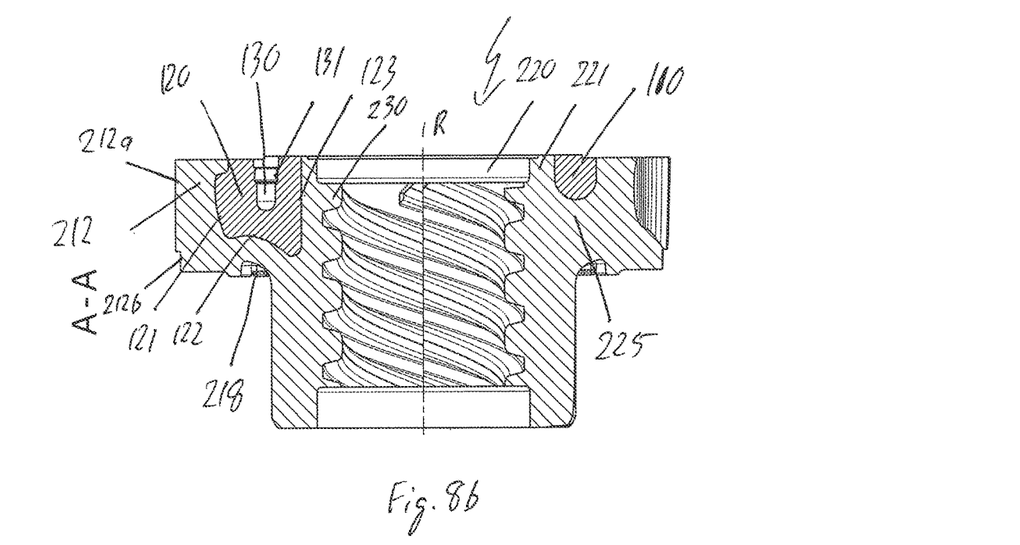

As can be clearly seen in particular in FIGS. 3 and 8b, a circumferential, concave depression 218 can be seen between the extension 240 and the second axial end face 3. This circumferential concave depression 218 ensures a reduction in the shearing forces when the gear 1 is loaded.

Figure 6:
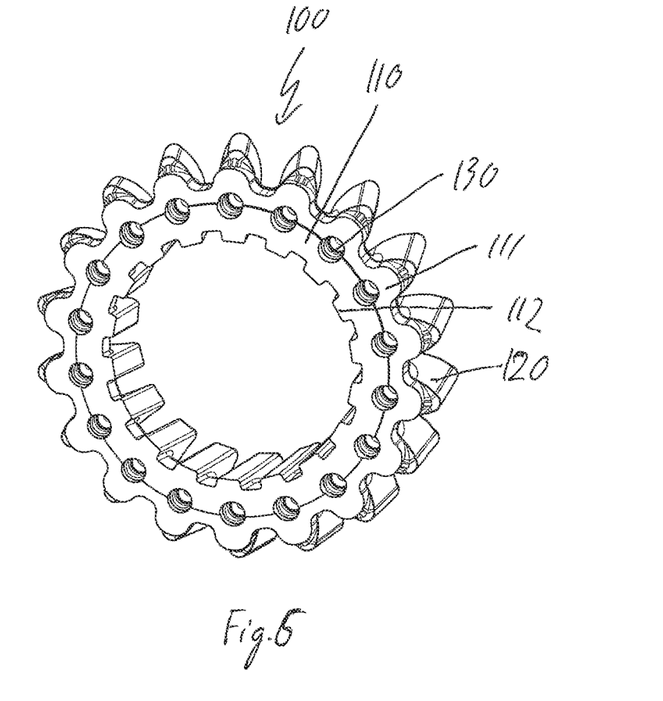
FIG. 6 is a perspective view of the support body inserted into the gear of FIGS. 1 to 5, viewed obliquely from the front.
Figure 7:
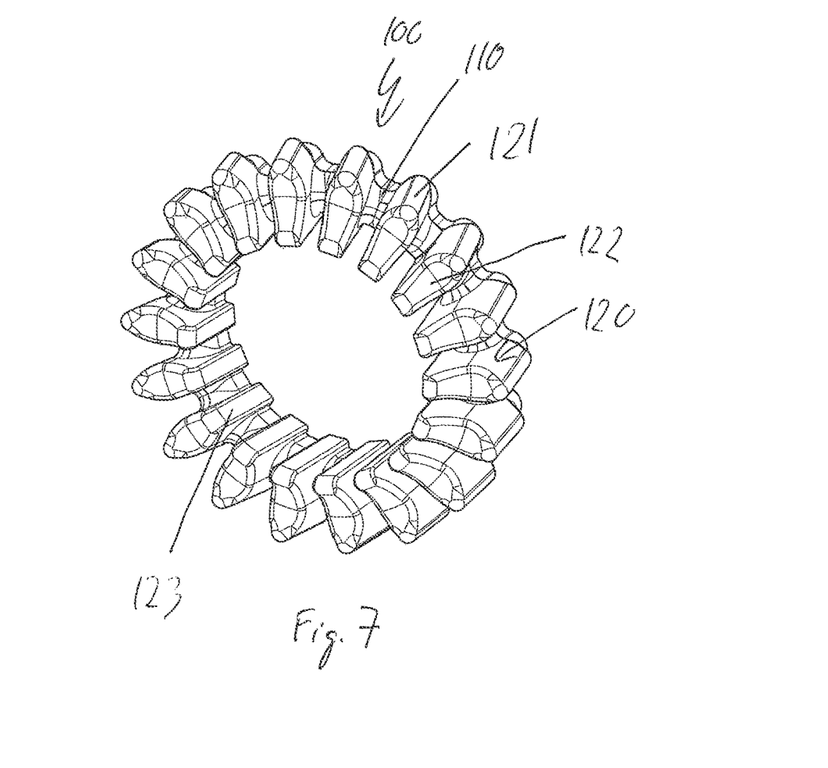
FIG. 7 is a perspective view of the support body from FIG. 6 from obliquely behind.

The structure of the support body 100 can be seen particularly well in FIGS. 6 and 7. As can be seen from these figures, the support body 100 has an annular carrier structure 110 which is oriented perpendicularly to the axis of rotation and on which a reinforcing portion 120 is arranged for each tooth 212.

Figure 10A:
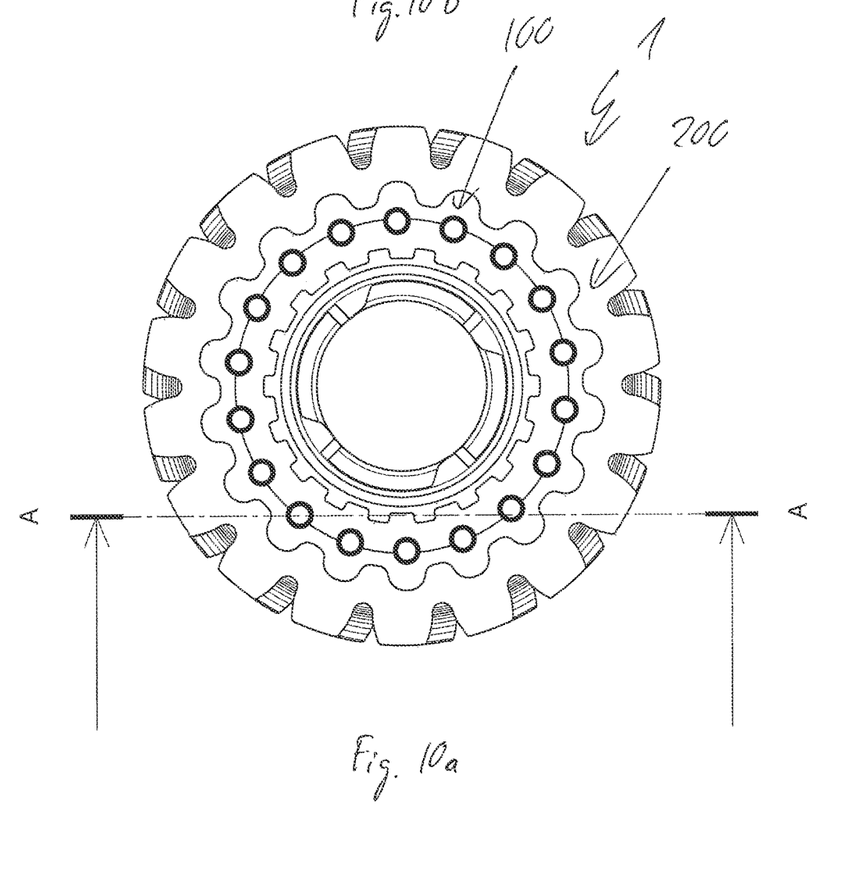
FIG. 10a is a top view of the front side of the gear of FIGS. 1 to 5 with a third section line A-A.
Figure 10B:
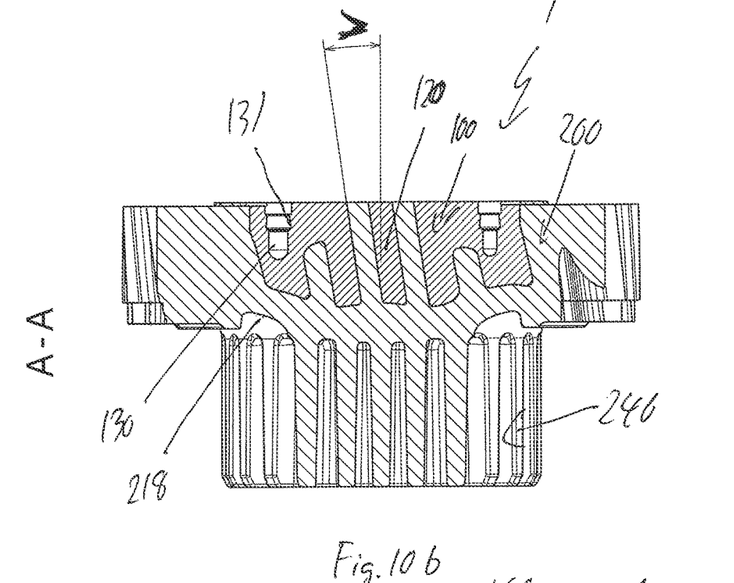

In particular, the reinforcing portions 120, starting from the annular carrier structure 110, do not extend exactly in the axial direction of the central axis R, but at the angle V, which is illustrated by the sectional view shown in FIG. 10b along the section line A-A shown in FIG. 10a. In this exemplary embodiment, the angle V is smaller than the helix angle W and is given by the formula $$V = \arctan(\tan(W) \times (r)/(d0/2)),$$

where d0/2=half the pitch diameter of the external toothing 210 and r=distance of a reference point of the reinforcing portion 120 from the axis of rotation R.

Such a reference point can in particular lie at the reinforcing portion tip nearest the toothing. In this case, r would then be the radius of the addendum circle of the reinforcing portions of the support body.

The reinforcing portions 120 can extend in the radial direction toward respective teeth 212 of the external toothing 210 and can extend as far as the dedendum circle of the external toothing 210 or even protrude into it. In particular, the reinforcing portions 120 can at least partially protrude beyond the annular carrier structure 110 in the radial direction; this can be seen in FIG. 6 and in the sectional view shown as FIG. 8b along the section line A-A shown in FIG. 8a. As illustrated in FIG. 8b, this results in the reinforcing portions 120 being embedded in the gear body 200 when the support body 100 is overmolded during the manufacture of the gear and not being able to work their way out of the gear body.

As can be clearly seen in FIG. 6, for example, the annular carrier structure 110 has first projections 111 which each project in the radial direction toward a tooth 212 of the external toothing 210. These first projections 111 of the annular carrier structure 110 are set back in the radial direction with respect to the maximum extent of the reinforcing portions 120, while the reinforcing portions 120 are set back in the axial direction with respect to the end face of the annular carrier structure 110 so that overmolding results in a portion of the tooth body 200 which covers the reinforcing portion 120 in the axial direction and thus further prevents the support body 100 from working its way out.

The transmission of force via the support body 100 is further improved by second projections 112 provided on the annular carrier structure 110 which are set back counter to the radial direction toward the wall of the receiving opening and each lie opposite a corresponding first projection 111 at a relevant point of the annular carrier structure 110.

Furthermore, the support body 100 has openings 130 which each extend through the annular carrier structure 110 into a reinforcing portion 120 in a direction parallel to the axis of rotation R. These openings are provided with an undercut 131.

Further particularities of the shaping of the reinforcing portions 120 can be seen from the perspective selected in FIG. 7 and from FIG. 8b. The tooth-side flank 121 of the reinforcing portions 120 is shorter than its receptacle-side flank 123, to which the tooth-side flank is connected via a concave end face 122 of the reinforcing portion 120 in question. This shaping makes it possible to reinforce as long a portion of the receptacle 240 as possible while still being able to provide the concave depression 218 in the gear body 200.

Such a gear 1 is expediently manufactured as follows:
injection molding of the support body 100 from the second plastic material,
overmolding the support body 100 with a gear body 200 made of the first plastic material, which has a lower stiffness and higher elasticity than the second plastic material, wherein
the gear body 200 has outer toothing 210 and inner spindle-nut toothing 230 for receiving the spindle 50, and
the overmolding takes place in such a way that surface portions of the external toothing 210, of the wall 221 of the receiving opening 220, of the intermediate portion 225, and of the support body 100 form a substantially flat end face of the gear 1.

One option in this case is that the support body 100 can be prefabricated and placed in an injection molding die and the gear body is then injection molded in a suitable mold. Alternatively, however, a particular tool can be provided in accordance with what is known as two-component technology, in which the support body 100 is first plastic-injection-molded and then the gear body 200 is molded onto this support body 100 in the same mold. In both methods, the gear body 200 has a plurality of injection points 270 (visible in FIGS. 3 and 5) which are preferably located axially on the side facing the reinforcing portions 120 of the support body 100.

LIST OF REFERENCE NUMERALS

1 Gear
2 (Front) side
3 (Rear) side
20 Shaft
30 Worm
50 Spindle
60 Radial and axial bearing
100 Support body
110 Annular carrier structure
111 First projection
112 Second projection
120 Reinforcing portion
121 Tooth-side flank
122 Concave end face
123 Receptacle-side flank
130 Opening
131 Undercut
200 Gear body
210 External toothing
212 Tooth
212a Tooth portion
212b Tooth portion
216 Step
218 Concave depression
220 Receiving opening
221 Wall
225 Intermediate portion
230 Spindle-nut toothing
240 Extension
242 Annular elongation
244 Rib
270 Injection point
D1, D2 Diameter
R Rotational axis
V Angle
W Helix angle
A-A Section line

The invention claimed is:

1. A gear (1) having a gear body (200) made of a first plastic material, wherein the gear body (200) has
an axis of rotation (R),
external toothing (210) arranged around an axis of rotation,
a centrally located receiving opening (220), and
an intermediate portion (225) located between the external toothing (210) and the wall (221) of the receiving opening (220),
wherein the gear body (200) is fixedly integrally formed on a support body (100), which is arranged at least partially in the intermediate portion (225) and is made of a second plastic material, which has a higher stiffness and lower elasticity than the first plastic material, such that surface portions of the external toothing (210), of the wall (221) of the receiving opening (220), of the intermediate portion (225), and of the support body (100) form a substantially flat end face of the gear (1), and wherein the support body (100) has reinforcing portions (120) for teeth (212) of the external toothing (210), characterized by the following additional features:

the external toothing (210) is helical toothing with teeth (212) which, at least in portions, extend at a helix angle (W) to the axis of rotation (R), at least some of the reinforcing portions (120) extend at least in portions at an angle (V) which corresponds at least approximately to the helix angle (W) of the helical toothing, the support body (100) has an annular carrier structure (110) which is oriented perpendicularly to the axis of rotation (R) and on which the reinforcing portions (120) are located, the annular carrier structure (110) has first projections (111) which each project in the radial direction toward a tooth (212) of the external toothing (210), and the first projections (111) of the carrier structure (110), which each project in the radial direction toward a tooth (212) of the external toothing (210), are set back in the radial direction with respect to the maximum extent of the reinforcing portions (120).

2. The gear (1) according to claim 1, characterized in that the second plastic material is a glass-fiber-reinforced, aramid-fiber-reinforced, or carbon-fiber-reinforced plastic material or a glass-bead or mineral-filled plastic material.

3. The gear (1) according to claim 1, characterized in that the first plastic material is a friction-optimized plastic material or a thermoplastic.

4. The gear (1) according to claim 1, characterized in that the angle (V) is smaller than the helix angle (W).

5. The gear (1) according to claim 1, characterized in that the reinforcing portions (120) are set back in the axial direction with respect to the substantially flat end face.

6. The gear (1) according to claim 1, characterized in that the annular carrier structure (110) has second projections (112) which are set back counter to the radial direction toward the wall (221) of the receiving opening (220).

7. The gear (1) according to claim 6, characterized in that a first projection (111), which projects in the radial direction toward a tooth (212) of the external toothing (210), and a second projection (112), which is set back counter to the radial direction toward the wall (221) of the receiving opening (220), are opposite one another at each relevant point of the annular carrier structure (110).

8. The gear (1) according to claim 1, characterized in that spindle-nut toothing (42) is arranged in the receiving opening (40).

9. The gear (1) according to claim 1, characterized in that the gear body (200) has, on the side (3) opposite the end face formed by portions of the gear body (200) and portions of the support body (100), an extension (240) for receiving a radial and axial bearing (60).

10. The gear (1) according to claim 9, characterized in that the extension (240) is formed as a circumferential ring (242) having a plurality of evenly distributed ribs (241) which are directed radially outward, an outer diameter (D2) of the extension (240) being smaller than an outer diameter (D1) of the external toothing (210).

11. The gear (1) according to claim 9, characterized in that a circumferential, concave depression (218) is provided between the extension (240) and an axial side (3) of the gear (1), the axial side being the side nearest the extension.

12. The gear (1) according to claim 1, characterized in that radially outwardly pointing end faces of the teeth (212) of the gear (1), viewed in the axial direction of the gear (1), have at least one step (216).

13. The gear (1) according to claim 1, characterized in that the teeth (212) of the external toothing (210) have, viewed in the axial direction, a peripheral tooth portion (212b) which transitions from the helical toothing with the angle (W) into spur toothing with the helix angle 0°.

14. The gear (1) according to claim 1, characterized in that the helix angle (W) is greater than 0° and less than about 25°.

15. A gear (1) having a gear body (200) made of a first plastic material, wherein the gear body (200) has an axis of rotation (R), external toothing (210) arranged around an axis of rotation, a centrally located receiving opening (220), and an intermediate portion (225) located between the external toothing (210) and the wall (221) of the receiving opening (220), wherein the gear body (200) is fixedly integrally formed on a support body (100), which is arranged at least partially in the intermediate portion (225) and is made of a second plastic material, which has a higher stiffness and lower elasticity than the first plastic material, such that surface portions of the external toothing (210), of the wall (221) of the receiving opening (220), of the intermediate portion (225), and of the support body (100) form a substantially flat end face of the gear (1), and wherein the support body (100) has reinforcing portions (120) for teeth (212) of the external toothing (210), characterized by the following additional features:

the external toothing (210) is helical toothing with teeth (212) which, at least in portions, extend at a helix angle (W) to the axis of rotation (R), at least some of the reinforcing portions (120) extend at least in portions at an angle (V) which corresponds at least approximately to the helix angle (W) of the helical toothing, and the relationship between the angle (V) and the helix angle (W) is given by the formula:

$$V = \arctan(\tan(W) \times (r)/(d0/2)),$$

where d0/2=half the pitch diameter of the external toothing (10), r=distance of a reference point of the reinforcing portion from the axis of rotation (R).

16. The gear (1) according to claim 15, characterized in that the support body (100) has an annular carrier structure (110) which is oriented perpendicularly to the axis of rotation (R) and on which the reinforcing portions (120) are located.

17. The gear (1) according to claim 16,
characterized in that the annular carrier structure (110) has first projections (111) which each project in the radial direction toward a tooth (212) of the external toothing (210).

18. The gear (1) according to claim 17,
characterized in that the first projections (111) of the carrier structure (110), which each project in the radial direction toward a tooth (212) of the external toothing (210), are set back in the radial direction with respect to the maximum extent of the reinforcing portions (120).

19. The gear (1) according to claim 16,
characterized in that the support body (100) has openings (130) which each extend through the annular carrier structure (110) into a reinforcing portion (120) in a direction parallel to the axis of rotation.

20. The gear (1) according to claim 19,
characterized in that at least some of the openings (130) have an undercut (131).

\* \* \* \* \*